US008317963B2

(12) United States Patent
Langtry et al.

(10) Patent No.: US 8,317,963 B2
(45) Date of Patent: Nov. 27, 2012

(54) AFFIXING AN ANCHOR IN A DRILLED HOLE

(76) Inventors: David Langtry, New Westminster (CA); William G. Steed, New Westminster (CA)

( * ) Notice: Subject to any disclaimer, the term of this patent is extended or adjusted under 35 U.S.C. 154(b) by 1131 days.

(21) Appl. No.: 11/283,399

(22) Filed: Nov. 21, 2005

(65) Prior Publication Data
US 2006/0113031 A1    Jun. 1, 2006

Related U.S. Application Data

(60) Provisional application No. 60/630,655, filed on Nov. 26, 2004.

(51) Int. Cl.
*B32B 37/00* (2006.01)
(52) U.S. Cl. ..................... 156/293; 156/272.2
(58) Field of Classification Search .................. 156/293, 156/71, 64, 272.2; 52/698, 704; 219/608, 219/600, 605, 637, 647, 650, 660, 661, 663, 219/664, 668; 411/82.2, 378
See application file for complete search history.

(56) References Cited

U.S. PATENT DOCUMENTS

| | | | | |
|---|---|---|---|---|
| 2,448,653 A * | 9/1948 | Fay | ................................ | 73/37.5 |
| 3,897,713 A * | 8/1975 | Gugle | ............................ | 411/389 |
| 4,010,519 A * | 3/1977 | Worthing | ....................... | 403/404 |
| 4,110,053 A * | 8/1978 | Buchholz | ....................... | 403/361 |
| 4,355,222 A * | 10/1982 | Geithman et al. | ............. | 219/633 |
| 5,397,202 A * | 3/1995 | Shrader et al. | ............. | 405/259.6 |
| 5,435,389 A * | 7/1995 | Shu et al. | ....................... | 166/276 |
| 6,229,127 B1 * | 5/2001 | Link | .............................. | 219/635 |
| 6,484,471 B2 | 11/2002 | Steed et al. | | |
| 6,913,666 B1 * | 7/2005 | Aeschlimann et al. | ...... | 156/73.1 |
| 2004/0126127 A1 * | 7/2004 | Fujimori et al. | ................ | 399/70 |

FOREIGN PATENT DOCUMENTS

| | | | |
|---|---|---|---|
| JP | 10002020 A | * | 1/1998 |
| WO | WO 9821023 A1 | * | 5/1998 |
| WO | WO 9842988 A1 | * | 10/1998 |

OTHER PUBLICATIONS

Machine Translation of JP 10002020 A, Date Unvavaliable.*

* cited by examiner

*Primary Examiner* — Daniel McNally
(74) *Attorney, Agent, or Firm* — Adrian D. Battison; Ade & Company Inc.

(57) ABSTRACT

An anchor is fastened into a drilled hole in substrate layer such as concrete by providing on an end portion of the anchor a surrounding layer of an adhesive of a character that it softens when heated and sets when it cools with a portion of the anchor exposed outside the hole. The exposed portion is heated by an inductive heating device in a heating cycle where the heating cycle is actuated by the operator switch but accurately controlled and limited to a single operation in the presence of the anchor by a control in the device in dependence on sensed environmental conditions and a measured size of the anchor.

4 Claims, 5 Drawing Sheets

AFFIXING AN ANCHOR IN A DRILLED HOLE

This application claims under 35 U.S.C. 119 the filing date of Provisional Application No. 60/630,655 filed Nov. 26, 2004

This invention relates to a method of and apparatus for affixing an anchor in a drilled hole.

It is well known that such drilled holes can be formed in concrete or other materials but the field with which the present invention is concerned is primarily concrete anchors.

The use of a setting or curing resin or other plastic material to bond an anchor into a drilled hole is known from a number of prior art documents. In particular U.S. Pat. No. 6,484,471 of the present inventors issued Nov. 26, 2002 discloses a method in which an anchor is inserted into a drilled hole with the anchor having a central core within which is a chemical which reacts with oxygen in an exothermic reaction to generate heat within the anchor to affect an adhesive material on the exterior of the anchor.

It is known that the anchor itself may be formed of a threaded rod or may be more complex in shape including a threaded section and a bottom insert section. In most cases however the bottom insert section will have external projections for engaging into the adhesive or resin material on the exterior surface. Thus the arrangement disclosed herein can utilize any of the above features including those disclosed in the above patent, disclosure of which is incorporated herein by reference.

U.S. Pat. No. 6,484,471 describes the method of placing the adhesive on the anchor, thus eliminating the problems involved with mixing adhesives, usually consisting of two or more compounds, and after mixing, applying these adhesives into holes provided for the anchors. The arrangement shown herein, while useful under certain conditions, is expensive to manufacture and difficult to store and handle.

An induction heating head or probe is disclosed for example in U.S. Pat. No. 4,355,222 (Geithman) assigned to Boeing and issued Oct. 19$^{th}$, 1982. This patent discloses a technique by which a cylindrical ferrite core is excited with 35 kHz energy for a period of about 10 seconds thereby heating the fastener to approximately 600 degrees F.

SUMMARY OF THE INVENTION

It is one object of the present invention to provide an improved method and apparatus for actuating an adhesive anchor in a hole for adhesive attachment of the anchor in the hole.

According to the invention there is provided a method for affixing an anchor to a substrate layer comprising:

drilling a hole in the substrate layer;

providing an anchor having one end portion shaped and arranged to fit in the hole;

providing on said one end portion of the anchor a surrounding layer of an adhesive of a character that it softens when heated and sets when it cools;

inserting the portion with the adhesive layer thereon into the hole;

a portion of the anchor being exposed outside the substrate layer out of the hole;

applying inductive heating by an inductive heating device in a heating cycle to the exposed portion of the anchor sufficient to heat the adhesive layer in the hole so that the adhesive layer conforms to an exterior surface of the portion and to an interior surface of the hole;

and allowing the adhesive layer to cool so as to set in the hole to attach the portion of the anchor to the hole.

Preferably the portion includes projecting elements thereon for engaging into the adhesive layer for example the portion may be threaded.

Preferably the method includes varying the heating cycle in accordance with a size of the anchor so as to effect a required level of heating for a selected anchor.

Preferably the heating cycle is varied by measuring the size of the anchor.

Preferably the method includes providing on the heating device a receptacle for receiving the anchor and for locating the heating device on the anchor and providing on the heating device a measuring device for measuring the anchor while located in the receptacle.

Preferably the measuring device comprises a measuring arm movable relative to the heating device in response to engagement with the anchor.

Preferably the heating device includes a manually actuable switch for commencing the heating cycle and the heating cycle is automatically controlled by the heating device.

Preferably the method includes detecting the presence of the anchor at the heating device and actuating the heating cycle only when the anchor is present.

Preferably the method includes detecting the presence of the anchor at the heating device and actuating the heating cycle only once until heating device is removed from anchor.

Preferably the heating device includes an indicating light to confirm the heating cycle is complete.

Preferably the method includes varying the heating cycle in accordance with environmental conditions.

Preferably the method includes providing on the heating device at least one sensor for the environmental conditions.

Preferably the at least one sensor is arranged to measure temperature and humidity.

According to a second aspect of the invention there is provided an apparatus for affixing an anchor into a drilled hole in a substrate layer wherein the anchor has one end portion shaped and arranged to fit in the hole with a layer of an adhesive of a character that it softens when heated and sets when it cools and an exposed portion of the anchor exposed outside the substrate layer out of the hole, the apparatus comprising:

a manually movable housing for moving to the exposed portion of the anchor;

an inductive heating coil mounted on the housing;

a receptacle for locating the heating coil at the exposed portion of the anchor;

a control for applying a heating cycle to the exposed portion of the anchor sufficient to heat the adhesive layer in the hole so that the adhesive layer conforms to an exterior surface of the portion and to an interior surface of the hole;

a manually operable switch for commencing the heating cycle;

the control being arranged to effect varying of the heating cycle in accordance with a size of the anchor so as to effect a required level of heating for a selected anchor.

Preferably there is provided a measuring device on the heating device for measuring the anchor while located in the receptacle.

Preferably the measuring device comprises a measuring arm movable relative to the heating device in response to engagement with the anchor.

Preferably there is provided a detecting device for detecting the presence of the anchor at the heating device and wherein the control is arranged to actuate the heating cycle only when the anchor is present.

Preferably the detecting device and the control are arranged to actuate the heating cycle only once until heating device is removed from anchor.

Preferably there is provided an indicating light to confirm the heating cycle is complete.

Preferably there is provided a sensor for measuring environmental conditions and wherein the control is arranged to vary the heating cycle in accordance with environmental conditions.

DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
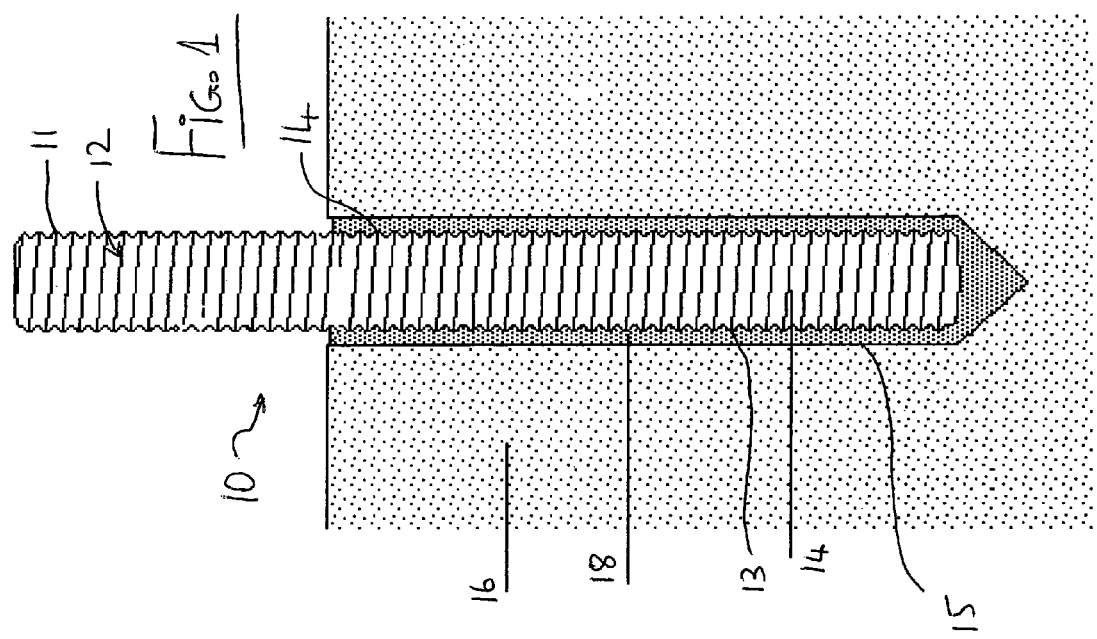
FIG. 1 is a cross sectional view showing an anchor inserted into a drilled hole prior to activation of the adhesive.
Figure 2:
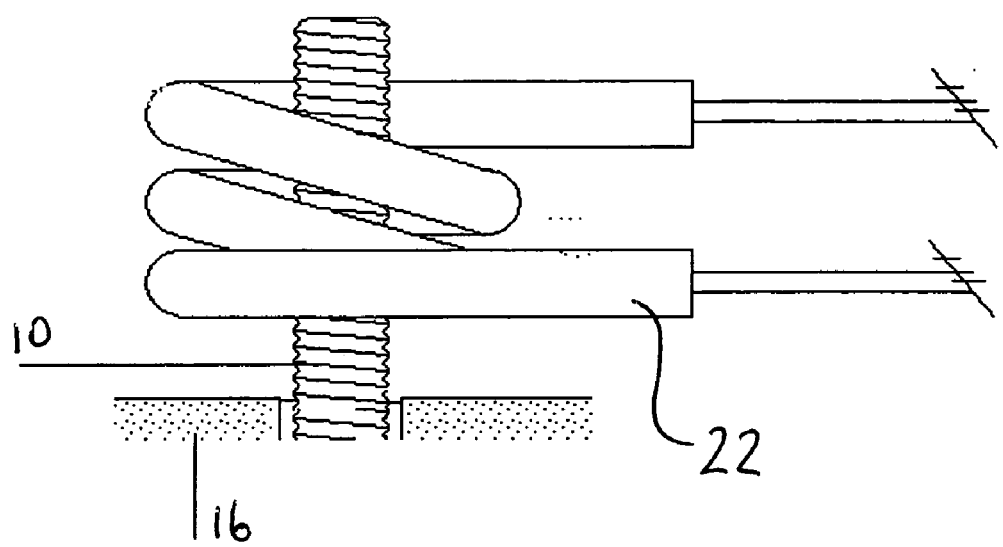
FIG. 2 is a similar cross sectional view showing the anchor inserted and in the process of being heated by an induction heating head.
Figure 3:
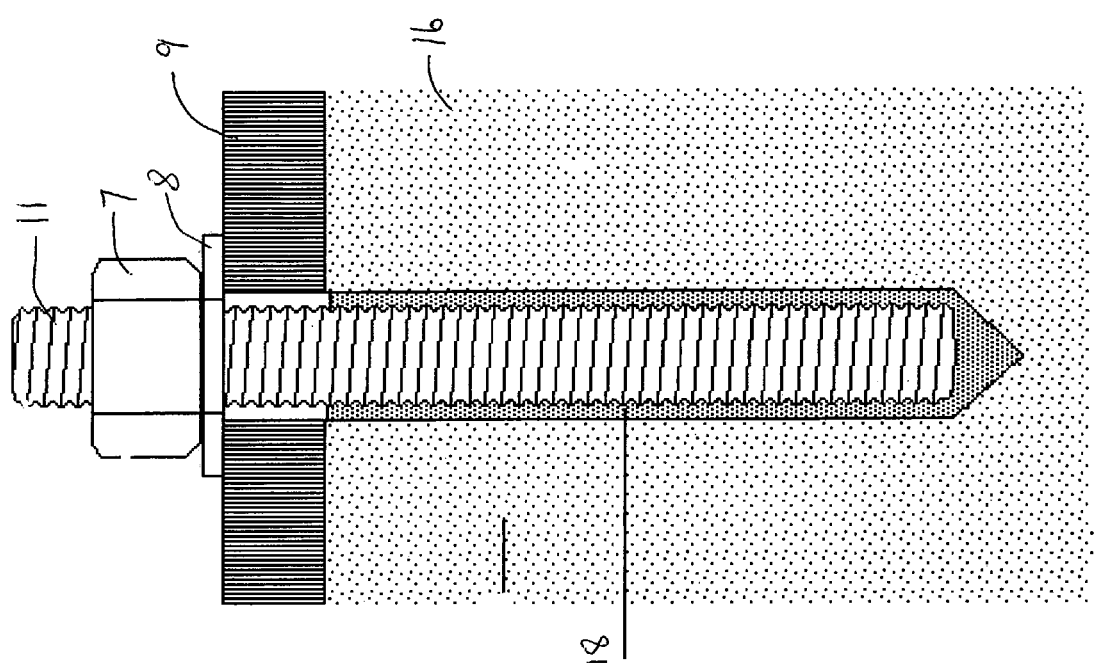
FIG. 3 is a cross sectional view showing the finished installed anchor.
Figure 4:
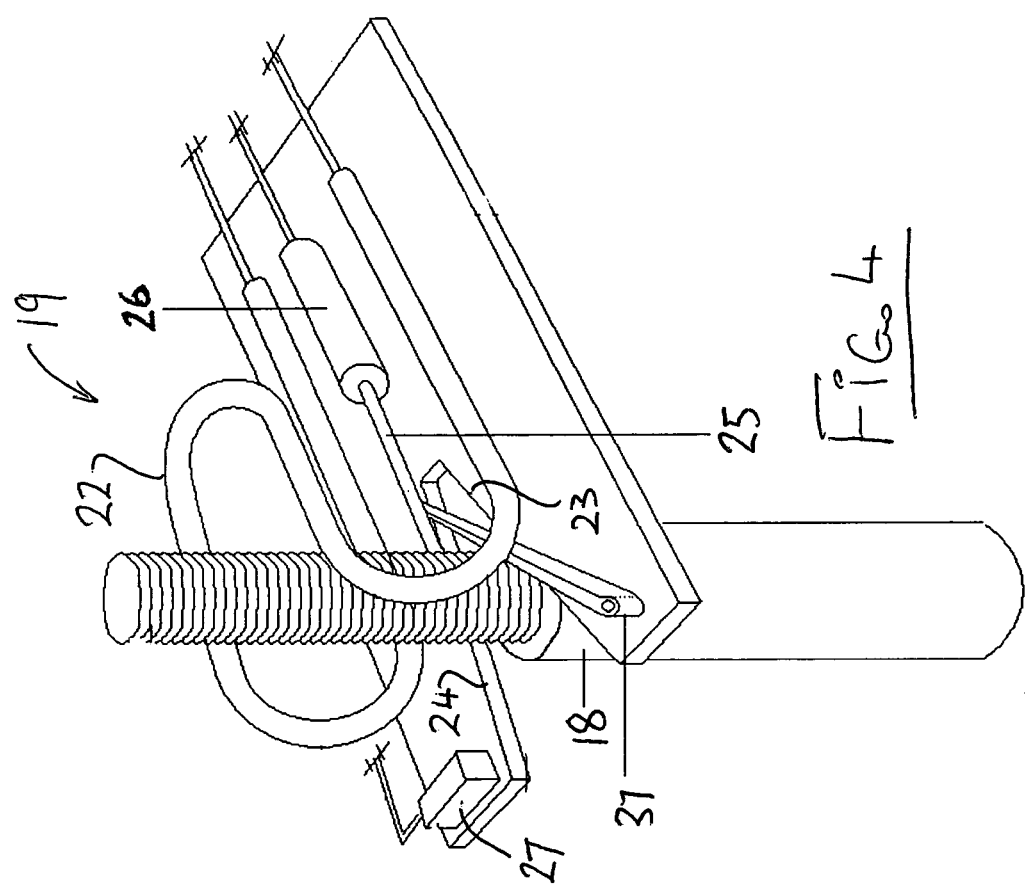
FIG. 4 is an isometric view of the anchor and induction heating assembly with the housing omitted for convenience of illustration.
Figure 5:
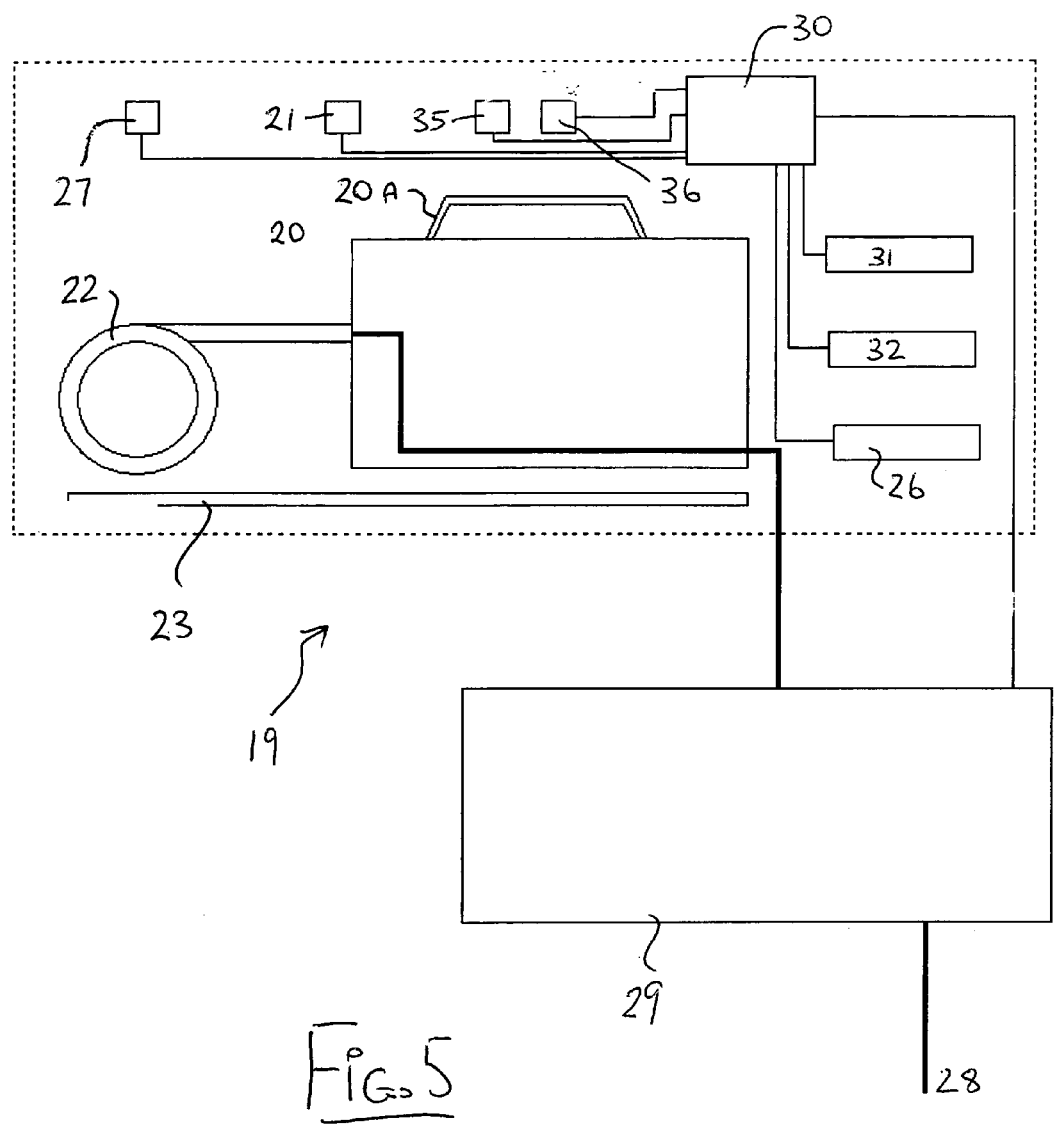
FIG. 5 is schematic illustration of induction heating assembly of FIG. 4.

In FIG. 1 is shown an anchor body 10 in the form of a rod with external projections 11 in an upper portion 12 and projections 13 in a lower insert portion 14 arranged to be inserted into a drilled hole 15 in a body of concrete 16 or the material.

The projections 11 and 13 are formed in the embodiment shown as a continuous threaded section on the exterior of a rod. However other projections can be provided in many different arrangements as is well known to one skilled in the art.

The anchor 10 carries on its exterior surface a band 18 of an adhesive which has the character that it softens when heated and sets when it cools, such as a hot melt adhesive. Thus the band 18 is generally cylindrical where an inner surface 19 in contact with and engagement with the exterior surface of the rod so that it follows the shape of the surface with the projections 13. The band 18 has an exterior surface 20 which is generally cylindrical so as to approximately match the cylindrical surface of the drilled hole 15. The adhesive is thus formed with a thickness which is the difference between the exterior diameter of the anchor 10 and the interior diameter of the hole 15. This thickness is sufficient to allow the projections 13 to be received within the hole leaving a clearance between the exterior of the projection and the interior of the hole. The difference in diameter is maintained relatively small so as to avoid providing shear forces through the structure of the hot melt adhesive when force is applied to the anchor.

Hot melt adhesive is readily available from many manufacturers and has the property that it is solid and non-tacky at ambient temperatures but can be melted at elevated temperatures well above ambient temperatures so that it flows and thus can enter pores and intestacies to provide an effect bond as the material cools and resets. Many different such thermoplastic materials are readily available providing a required strength and temperature of melting as will be determined by a person skilled in the art.

The anchor as supplied is inserted into the drilled hole 15 and an induction heating head is applied over the upper section 11 of the anchor which is exposed above the hole. This arrangement can be used to heat the exterior portion 11 above the hole so that the heat is conducted through the body of the anchor to the hot melt adhesive 18 to effect melting of the adhesive and spreading of the adhesive into the interior between the anchor and the drilled hole so as to provide bonding of the exterior surface of the adhesive into the intestacies and pores of the drilled hole to adhesively attach the anchor into the drilled hole.

After activation of the adhesive 18, the anchor is completed by a bracket 9 which is held in place by a washer 8 clamped by a nut 7 on the threaded portion 11.

One example is now described of a device and method which may be used to produce a product at a considerably lower cost thereby making it economically feasible for use by a larger number of individuals and companies. By retaining the concept of placing the adhesive on the anchor body as shown in U.S. Pat. No. 6,484,471 but replacing the internal heat source with an external source a much simpler and economical anchor can be produced.

The outside source of heat is generated by a known technology generally referred to as induction heating. The process of induction heating relies on induced currents (eddy currents) within material to produce heat within that material. The basic components of an induction heating system are an alternating current (AC) power supply, an induction coil and the article in which heat is to be generated. The power supply sends an alternating current through a coil, preferably placed in close proximity to the article to be heated. Under these circumstances, eddy currents are induced within the article to be heated, generating controllable amounts of heat without physical contact between the coil and the article.

Alternating current at frequencies of 5 to 30 kHz are commonly used and there is a direct relationship between the frequency of the alternating current and the depth of heat penetration and the time taken to heat an article of a given size. The induced current flow within an article is most intense on the surface so the outside of an object will heat more rapidly than the inner portion.

It is desirable to cause the metallic portion of the anchor to reach such a temperature that the attached heat sensitive adhesive is brought to a temperature where, in the case of a two part adhesive coating, the activating agent and the main adhesive component are caused to melt or liquefy, later to cool and harden.

The method may use a single component adhesive is used, such as a 'hot melt' adhesive, where enough heat must be generated to bring the adhesive to a liquid or molten state. The use of induction heating provides the rapid heating and precise control of temperatures required to accomplish this.

There are three primary variables involved in attaining the required amount of heat, the first being the size of the anchor installed. There is, for the most part, a direct relationship between the length and diameter of the various anchors to be used with this system.

Two other variables, ambient temperature and humidity within the immediate area of the anchor to be activated are important in order to determine the precise amount of time the unit needs to operate to provide the required temperature. Using known technology, two sensors are provided to make measurable signals available to the microprocessor.

The control system of the heating device is arranged to control the heating cycle in dependence upon these measured characteristics to ensure an accurate application of heat to the exposed portion of the anchor and thus to the adhesive.

The heating device 19 includes a manually portable housing 20 which can be lifted by the operator by a handle 20A and moved form anchor to anchor located in a concrete substrate layer. The housing includes a circuit having a manually operable switch 21 for actuation of heat to a coil 22.

The coil is located at a receptacle 23 in the form of a pair of surfaces which define a V-shape by sides 24. This acts to locate the anchor when in the V-shaped receptacle so that it is properly placed within the heating coil above the receptacle 23.

At the receptacle is located a detecting or measuring arm 25 so that as the anchor enters the receptacle it engages the arm 25 and depresses the arm. The arm is mounted on a sensor 26 so that it can move in dependence upon its engagement with the anchor surface of the exposed portion of the anchor above the hole. The receptacle carries a micro-switch 27 which provides an indication of when the anchor is properly located in the receptacle.

The circuit receives power from a source 28 controlled by a power supply module 29. The power to the coil is controlled in a heating cycle of required length for the conditions by a microprocessor controller 30. Input to the microprocessor 30 is provided from the measuring arm sensor 26 and the gate micro-switch 27 responsive to the presence of the anchor in the receptacle and by environment sensors including temperature sensor 31 and humidity sensor 32.

The sizing plate or receptacle 23, mentioned in the technical description, with its V-shaped opening (sizing notch) defined by sides 24 and the position sensor (size (diameter) sensor) 33 provides a measurable signal, related to the diameter of the exposed portion of the anchor, to the microprocessor 30 in the following manner. With the anchor positioned in its hole in the substrate and before the adhesive is activated, the unit carrying the sizing plate is positioned before the anchor and moved toward the anchor, the exposed portion of the anchor enters the V-shaped notch in the sizing plate. At some point, dependant on the diameter of the anchor, the sizing plate can not be moved further in a forward direction because the anchor has come to rest against both angle edges of the V-shaped notch. During this operation, the sizing sensor arm 25 is forced rearward by contact with the exposed portion of the anchor and a measurable signal is made available to the microprocessor indicating the diameter of the exposed portion of the anchor.

The sizing sensor 26 may be of known technology such as a resistance measuring device which is calibrated in relation to the length and angle of the sizing slot edges so as to provide and accurate and repeatable signal directly related to anchor diameter.

When the operating switch 21 is activated information from these three sensors 31, 32 and 33 is correlated within the programmable microprocessor controller 30 to provide a time related signal to the power supply 29 which then operates for the required time period to supply induction heating energy to the coil 22.

Due to the critical nature of the temperature levels required, it is desirable to remove as much control as possible from the operator of the device. This is accomplished by providing the activating switch 21 of the momentary contact type which only begins the process, after which control is maintained by the microprocessor. Two warning lights 35 and 36 are provided on the heating unit. The first 35, green in color, is controlled by the microprocessor 30, and is illuminated when the unit is turned on or connected to line power, indicating to the operator that the unit is ready to use. A second warning light 36, red in color, also controlled by the microprocessor, illuminates when the momentary contact operating switch is pressed and remains illuminated until the heating cycle is complete, after which it is turned off and the green warning light is illuminated informing the operator that the unit is ready to be applied to another anchor.

In order to prevent an anchor from being heated twice, an arm or gate 37 is positioned on the sizing plate or receptacle 23 in such a position that it extends across the opening leading to the V-shaped opening in the sizing plate 23. The pivoted end of this gate 37 is spring loaded in order to return to its normal, at rest, position across the V-shaped opening. The opposite end of the spring loaded arm rests against the normally closed microswitch 27, which is also mounted on the sizing plate, holding the switch 27 in its open position. When the unit is positioned before the anchor and moved in a forward direction, the movement of the exposed portion of the anchor into the V-shaped slot in the sizing plate 23 causes the gate 37 to move away from the microswitch 27, allowing it to close. This information, in the form of a measurable signal informs the microprocessor that the unit is positioned over an anchor to be activated allowing the unit to operate through one cycle, however, if the operating switch 21 is activated more than once without moving the unit away from the anchor to allow the gate to open the microswitch 27, the microprocessor is programmed to block further operation.

When an inactivated anchor is to be processed the unit is positioned before the anchor and then moved forward till the anchor enters the angled sizing notch in the receptacle or sizing plate. The unit is then moved forward until the anchor will not enter the notch further. At this time, the pivoted gate 37, which normally rests across the opening to the receptacle 23, is also displaced rearwardly by the movement of the exposed portion of the anchor. This causes the switch 27 to move to its normally closed condition. Closing the switch 27 signals the microprocessor to allow sensor readings from the ambient temperature sensor 31, the humidity sensor 32 and the size sensor 33 to be correlated by the microprocessor to calculate optimum time for operation of the heating coil. At this time, the green warning light is illuminated to inform the operator that the unit is ready to be activated.

When the operator presses the momentary contact operating switch 21 a signal is sent to the microprocessor 30. On receipt of this signal, the microprocessor 30 turns off the green warning light and turns on the red warning light informing the operator that the heating process is under way. At the same time, the microprocessor sends a control signal to the power supply 29 which, in turn, supplies an alternating current of the preferred frequency to the heating coil for the precise amount of time required to heat the anchor and activate the adhesive. At the end of the heating cycle, the microprocessor 30 turns off the red warning light. The action of the green warning light is dependant upon the unit being removed from the activated anchor allowing the sizing plate gate switch to open.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

The invention claimed is:

1. A method for affixing an anchor to a substrate layer of rock or concrete comprising:
    drilling a hole in the substrate layer so that the drilled hole includes at least a part which has a cylindrical surface;
    providing an anchor in the form of a rod having a first end portion shaped and arranged to fit in the drilled hole and a second end portion integral with the first portion arranged to project outwardly from the hole beyond the substrate layer;

supplying the anchor while carrying on said first end portion of the anchor a surrounding cylindrical band of an adhesive of a character that it softens when heated and sets when it cools;

the portion with the adhesive band thereon being arranged so that the band has an exterior surface which matches the cylindrical surface of the drilled hole;

said first end portion including projecting elements thereon extending outwardly therefrom and engaging into the surrounding adhesive band;

inserting said first end portion with the adhesive band thereon into the hole to a depth at which the cylindrical band of said surrounding adhesive has an outer cylindrical surface adjacent the cylindrical surface of the hole and the second portion of the anchor rod is exposed outside the substrate layer out of the drilled hole;

when inserted, the projecting elements on the first end portion are spaced from the cylindrical surface of the drilled hole leaving a clearance;

applying heat to the exposed portion of the anchor sufficient to heat the adhesive band in the drilled hole so that the adhesive band conforms to an exterior surface of the portion and to the cylindrical surface of the hole;

and allowing the adhesive band to cool so as to set in the drilled hole to attach the first end portion of the anchor to the drilled hole.

2. The method according to claim 1 wherein the projecting elements on said first end portion extend to a position closely adjacent the cylindrical surface of the drilled hole so that there are substantially no shear forces in the surrounding adhesive layer after the adhesive layer is set.

3. The method according to claim 1 wherein the first end portion is threaded.

4. The method according to claim 1 wherein the anchor is heated by induction heating.

* * * * *